H. HILL AND J. B. DYER.
DUST SEPARATOR.
APPLICATION FILED SEPT. 16, 1918.
1,339,757.
Patented May 11, 1920.
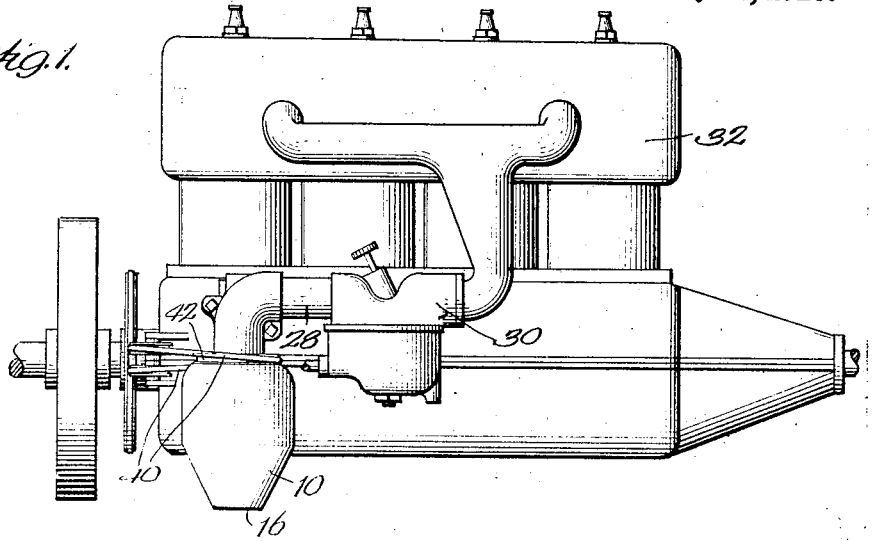
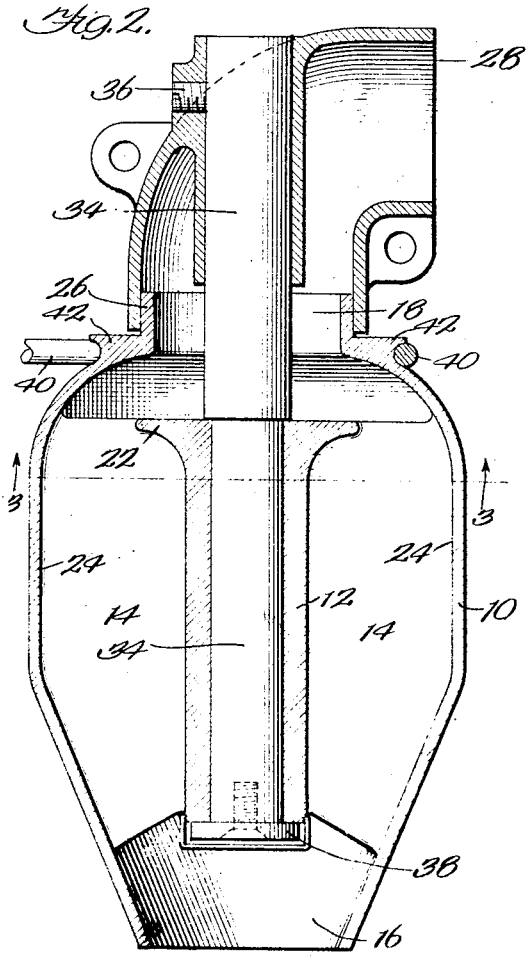
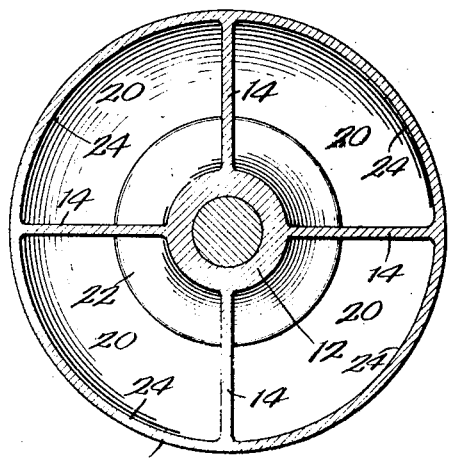
Inventors:
Hugh Hill
John B. Dyer
By Cheever & Cox Attys

UNITED STATES PATENT OFFICE.

HUGH HILL AND JOHN B. DYER, OF ANDERSON, INDIANA; SAID DYER ASSIGNOR TO SAID HILL.

DUST-SEPARATOR.

1,339,757.  Specification of Letters Patent.  Patented May 11, 1920.

Application filed September 16, 1918. Serial No. 254,240.

*To all whom it may concern:*

Be it known that we, HUGH HILL and JOHN B. DYER, both citizens of the United States, residing at Anderson, in the county of Madison and State of Indiana, have invented a certain new and useful Improvement in Dust-Separators, of which the following is a specification.

This invention is a dust collector, especially adapted for separating or removing dust from an otherwise normally moving stream of air. It is especially adapted for use in connection with the dust laden air drawn up by pneumatic cleaners, automobiles, and particularly tractor engines moving slowly over dry dust fields, where the wear of the dust, which under ordinary conditions gets into the engine rapidly destroys it.

The object of the invention is to provide mechanism of this class which practically removes the dust from a moving column of air under all conditions. The invention consists in mechanism capable of carrying out the foregoing objects, which can be easily and cheaply made, which is satisfactory in operation, and is not readily liable to get out of order. Broadly speaking, the invention consists in a rotating chamber, ordinarily of more or less cylindrical form, through which the air passes, the same being provided with internal means which separates the dust from the passing air and drives it to the interior walls of the rotating chamber, from which it removes itself by gravity when the machine stops. More particularly the invention consists in the features and details of construction which will be hereafter more fully set forth in the specification and claims.

Referring to the drawings in which similar numerals indicate the same parts throughout the several views, Figure 1 is an exterior view of an automobile or tractor engine having the device of this invention applied thereto.

Fig. 2 is a vertical sectional view through the center of the mechanism of this invention, illustrated in Fig. 1.

Fig. 3 is a horizontal sectional view taken in the direction of the arrows 3, 3 of Fig. 2.

The mechanism of this invention consists essentially of a rotatable chamber or receptacle 10 in the particular case here illustrated of generally cylindrical form, carried from a central hub 12 by radial partitions or wings 14 of less length than the chamber 10, the chamber being provided with an intake 16 and a discharge port 18 between which air flows through passages 20 formed by the wings 14 within the interior of the chamber 10, the areas of the ports 16 and 18 being less than the cross sectional area of the combined passages 20, the lower port 16 being of such size and so located that the dust can discharge itself therethrough by gravity when the machine stops.

This device works upon the basic principle of using centrifugal force to separate the dust from the passing air and to hold the dust within the machine while it is in motion. The fan blades or wings 14 are provided to give the passing air a high centrifugal force which throws the dust against the inner side of the outer wall of the chamber, where it is held by centrifugal force in the manner elsewhere described.

It is desirable to provide deflector devices within the chamber 10 to drive the passing air toward the inner wall 24. In the particular case here illustrated this is accomplished by providing at the upper end of the hub 12; that is to say, the end nearest the discharge port 18, a flange 22 of greater exterior diameter than the passage 18.

The chamber 10 thus constructed should be mounted with its axis of rotation in a generally vertical line and attached to the pipe to which the purified air is delivered. In the particular case here illustrated it is shown mounted so as to be rotatable in the bearing 26 formed in connection with the exterior wall of the intake passageway 28 leading to the carbureter 30 of the engine 32, shown in conventional form in Fig. 1.

In the case here shown, the chamber 10 is supported by a shaft 34, held rigid by a screw 36 inserted in a convenient rigid portion of the engine mechanism, the chamber 10 being rotatable upon the lower portion of this shaft 34 through the hub 12 and the horizontal supporting plate 38 at the end thereof. The method of rotatably supporting the chamber 10 with reference to the intake pipe 28 of the engine or other receptacle to be supplied with clean air is wholly immaterial and forms no essential detail part of this invention.

The chamber 10 must be rotated, and this may be accomplished by any suitable source of power and by any suitable means. In the particular case here shown, the chamber 10 is rotated by a belt 40 passing over a pulley 42 formed on one end of the chamber 10, this belt 40 being driven in any convenient manner from some rotating part of the engine 32.

In the operation of the device, the engine 32, or other mechanism to be supplied with air, is started, thus drawing air through intake port 16, passages 20, port 18 and pipe 28. At the same time the chamber 10 is rotated, with the result that the blades or wings 14 within the chamber are rotated about the center of shaft 34, with the result that they strike particles of air in the upward stream of air through chamber 10, thus aiding in giving them centrifugal motion to remove them from their normal upward movement with the stream of air and ultimately drive them to the interior wall 24 of the chamber by centrifugal force, this being assisted by the directing flange 22, heretofore described. The particles of dirt and dust thus removed to the wall 24 remain held in contact with that wall by centrifugal force until the engine is stopped, thus removing the centrifugal force which held the particles of dust in engagement with the wall, whereupon the particles drop by gravity out of the chamber 10 through the orifice 16.

From the foregoing it will be entirely clear that the openings 16 and 18 must be of less diameter than the interior diameter of the chamber 10; otherwise there would be no space afforded for the collection and retention of the dust and dirt within the chamber and rotation of the member 10 would not produce the desired result. Actual experiments have demonstrated that the pressure of air delivered from the rotating chamber 10 may be varied by changing in construction the sizes of the openings 16 and 18. If they are of equal area the pressure of air delivered to the engine is not changed from what it would be if the engine were operating without the presence of the chamber 10, but if the opening 18, i. e., the one next to the engine, is larger than the other opening 16 the blades 14 produce an increased flow of air toward, or in other words, a pressure upon the carbureter of the engine, while if the opening 16 is made larger than the opening 18 a partial vacuum will be effected in the pipe 28 leading to the engine. In actual practice, there is no occasion for adopting the latter construction, but there are cases in which the use of opening 18 larger than opening 16, thus creating a pressure on the carbureter, is desirable.

Having thus described our invention, what we claim as new and desire to secure by Letters Patent, is:—

1. In mechanism of the class described, in combination with a machine adapted to draw dust laden air into itself, a vertical rotatable chamber having a discharge port at its top entering the intake of said machine, means operated by the machine for rotating the chamber with reference to said machine, means inside said chamber for driving the dust therein toward the inner surface of the outer wall of the chamber, there being an air intake opening in the bottom of the chamber, the areas of said intake and discharge openings of said chamber being less than the cross sectional area of the interior of the chamber, while the lower opening is of a sufficient unobstructed size so that when the rotation of the chamber is stopped, dust inside the chamber discharges itself by gravity through said lower opening.

2. In mechanism of the class described, in combination with a machine adapted to draw dust laden air into itself, a vertical rotatable chamber provided with ports in its top and bottom, each of less area than the effective cross sectional area of the chamber, the lower of said ports being so arranged and located that when the chamber is at rest any dust within the chamber can freely discharge itself by gravity through said opening, and radial fan members inside the receptacle of less length than the receptacle and supported on said central axis adapted to drive dust particles within the chamber toward the inner surface of the outer wall of the chamber where they are held by centrifugal force as the chamber rotates and means operated by the machine for rotating the chamber.

In witness whereof we have hereunto subscribed our names in the presence of two witnesses.

HUGH HILL.
JOHN B. DYER.

Witnesses:
MABEL MILLSPAUGH,
JUNE HILL.